United States Patent
Ogawa

(10) Patent No.: US 8,948,941 B2
(45) Date of Patent: Feb. 3, 2015

(54) RAILWAY VEHICLE VIBRATION DAMPING DEVICE

(71) Applicant: Kayaba Industry Co., Ltd., Tokyo (JP)

(72) Inventor: Takayuki Ogawa, Sagamihara (JP)

(73) Assignee: Kayaba Industry Co., Ltd., Tokyo (JP)

( * ) Notice: Subject to any disclaimer, the term of this patent is extended or adjusted under 35 U.S.C. 154(b) by 0 days.

(21) Appl. No.: 14/346,912

(22) PCT Filed: Mar. 13, 2013

(86) PCT No.: PCT/JP2013/056948
§ 371 (c)(1),
(2) Date: Mar. 24, 2014

(87) PCT Pub. No.: WO2013/137296
PCT Pub. Date: Sep. 19, 2013

(65) Prior Publication Data
US 2014/0257606 A1   Sep. 11, 2014

(30) Foreign Application Priority Data
Mar. 14, 2012   (JP) ................................. 2012-056849

(51) Int. Cl.
*B61F 5/24* (2006.01)
*B61F 5/12* (2006.01)
*F16F 9/10* (2006.01)

(52) U.S. Cl.
CPC . *B61F 5/12* (2013.01); *B61F 5/245* (2013.01); *F16F 9/10* (2013.01)
USPC .......................................................... 701/19

(58) Field of Classification Search
CPC ............ B61F 5/24; B61F 5/245; B61F 5/308; B61F 5/12; F16F 7/00; F16F 7/10; F16F 15/10; F16F 15/20
USPC ......................... 701/19–20; 105/199.1, 199.2; 180/73.35, 266.1, 266.2, 378
See application file for complete search history.

(56) References Cited

U.S. PATENT DOCUMENTS

| | | | |
|---|---|---|---|
| 2012/0118194 A1* | 5/2012 | Schneider et al. | 105/171 |
| 2013/0158754 A1* | 6/2013 | Gotou | 701/19 |

FOREIGN PATENT DOCUMENTS

| | | | |
|---|---|---|---|
| JP | 05-213194 A | | 8/1993 |
| JP | 06-107173 A | | 4/1994 |
| JP | 06-278606 A | | 10/1994 |
| JP | H06-278606 | * | 10/1994 |
| JP | 11-139310 A | | 5/1999 |
| JP | 2003-320931 A | | 11/2003 |
| JP | 2008-247333 A | | 10/2008 |
| JP | 2009-23475 | * | 2/2009 |
| JP | 2009-023475 A | | 2/2009 |
| JP | 2011-195088 A | | 10/2011 |
| JP | 2011-201333 | * | 10/2011 |
| JP | 2011-201333 A | | 10/2011 |

* cited by examiner

*Primary Examiner* — Thomas G Black
*Assistant Examiner* — Ce Li
(74) *Attorney, Agent, or Firm* — Rabin & Berdo, P.C.

(57) ABSTRACT

A railway vehicle vibration damping device having at least two vibration suppression force generating sources interposed between a bogie and a vehicle body of a railway vehicle extracts from a transverse direction velocity of the vehicle body a frequency component at or above a frequency of a centrifugal acceleration of the vehicle body, and calculates a high frequency vibration suppression force on the basis thereof. When the railway vehicle travels in a curve section, at least a part of the vibration suppression force generating sources is caused to output the high frequency vibration suppression force, and the remaining vibration suppression force generating sources are caused to function as passive dampers. As a result, passenger comfort in the railway vehicle during travel in a curve section is improved.

7 Claims, 4 Drawing Sheets

RAILWAY VEHICLE VIBRATION DAMPING DEVICE

TECHNICAL FIELD

This invention relates to suppression of vibration in a railway vehicle during travel on a curve.

BACKGROUND ART

A railway vehicle vibration damping device that suppresses vibration of a railway vehicle body in a right-left direction relative to a travel direction of the railway vehicle comprises, for example, a variable damping force damper interposed between the vehicle body and a bogie of the railway vehicle. A damping force required to suppress the vibration of the vehicle body is determined from a yaw direction angular velocity of the vehicle body and a sway direction velocity of the vehicle body in a vehicle body center, and a damping force of the variable damping force damper is adjusted so that the determined damping force can be generated.

More specifically, a damping force required to suppress yaw direction vibration is calculated by multiplying a distance from the vehicle body center to a bogie center and a control gain by a yaw rate. Further, a damping force required to suppress sway direction vibration is calculated by multiplying a control gain by the sway direction velocity. The damping force to be generated by the variable damping force damper is then calculated by adding together the yaw direction vibration suppressing damping force and the sway direction vibration suppressing damping force.

JP2003-320931A, published by the Japan Patent Office, proposes providing variable damping force dampers for suppressing yaw direction and sway direction vibration respectively between a vehicle body and a front bogie that supports a vehicle body front portion and between the vehicle body and a rear bogie that supports a vehicle body rear portion.

SUMMARY OF INVENTION

A resonance frequency band of a vehicle body of a railway vehicle is from 0.5 hertz (Hz) to 2 Hz. Furthermore, when the railway vehicle travels through a curve section, centrifugal acceleration acts on the vehicle body, and a frequency of the centrifugal acceleration is extremely close to the resonance frequency of the vehicle body.

To obtain the yaw rate and the sway direction velocity of the vehicle body, acceleration sensors provided at a front and a rear of the vehicle body are typically used. The yaw rate is determined on the basis of a difference in the accelerations obtained by the acceleration sensors. The sway direction velocity is determined on the basis of a value obtained by adding together the two accelerations obtained by the acceleration sensors.

Since the yaw rate is determined on the basis of the acceleration difference, the effect of the centrifugal acceleration acting on the vehicle body when the railway vehicle travels through a curve section is removed. However, since the sway direction velocity is determined on the basis of the sum of the accelerations, the centrifugal acceleration is superimposed on the acceleration of the vibration. The effect of the centrifugal acceleration is therefore not removed from the sway direction velocity.

When the railway vehicle travels at a high speed, the centrifugal acceleration is considerable. Therefore, when the damping force is determined while the effect of the superimposed centrifugal acceleration remains on the sway direction velocity, the damping force becomes unnecessarily large, leading to a reduction in a passenger comfort of the railway vehicle.

Since the frequency of the centrifugal acceleration and the resonance frequency of the vehicle body are close as described above, an attempt to extract only vibration in the resonance frequency band of the vehicle body while removing the effect of the centrifugal acceleration by filtering the sway direction velocity of the railway vehicle using a band pass filter or a high pass filter is difficult. On the other hand, lowering a control gain when calculating a damping force for suppressing a vibration in the resonance frequency band of the vehicle body may prevent the centrifugal acceleration in a curve section from having an effect. In this case, however, the damping force for suppressing vibration in the resonance frequency band of the vehicle body becomes insufficient such that the passenger comfort of the railway vehicle is likewise impaired.

It is therefore an object of this invention to improve the passenger comfort of a railway vehicle in a curve section.

In order to achieve the above object, a railway vehicle vibration damping device according to this invention comprises at least two vibration suppression force generating sources interposed between a bogie and a vehicle body of a railway vehicle, a sensor that detects a transverse direction velocity of the vehicle body, and a programmable controller that controls the vibration suppression force generating sources.

The controller is programmed to extract from the transverse direction velocity of the vehicle body a frequency component equal to or higher than a frequency of a centrifugal acceleration that acts on the vehicle body when the railway vehicle travels in a curve section, calculate a high frequency vibration suppression force on the basis of an extracted frequency component of the transverse direction velocity, and when the railway vehicle travels in a curve section, cause at least a part of the vibration suppression force generating sources to output the high frequency vibration suppression force while causing all of the remaining vibration suppression force generating sources to function as passive dampers.

The details as well as other features and advantages of this invention are set forth in the remainder of the specification and are shown in the accompanying drawings.

DESCRIPTION OF EMBODIMENTS

Figure 1:
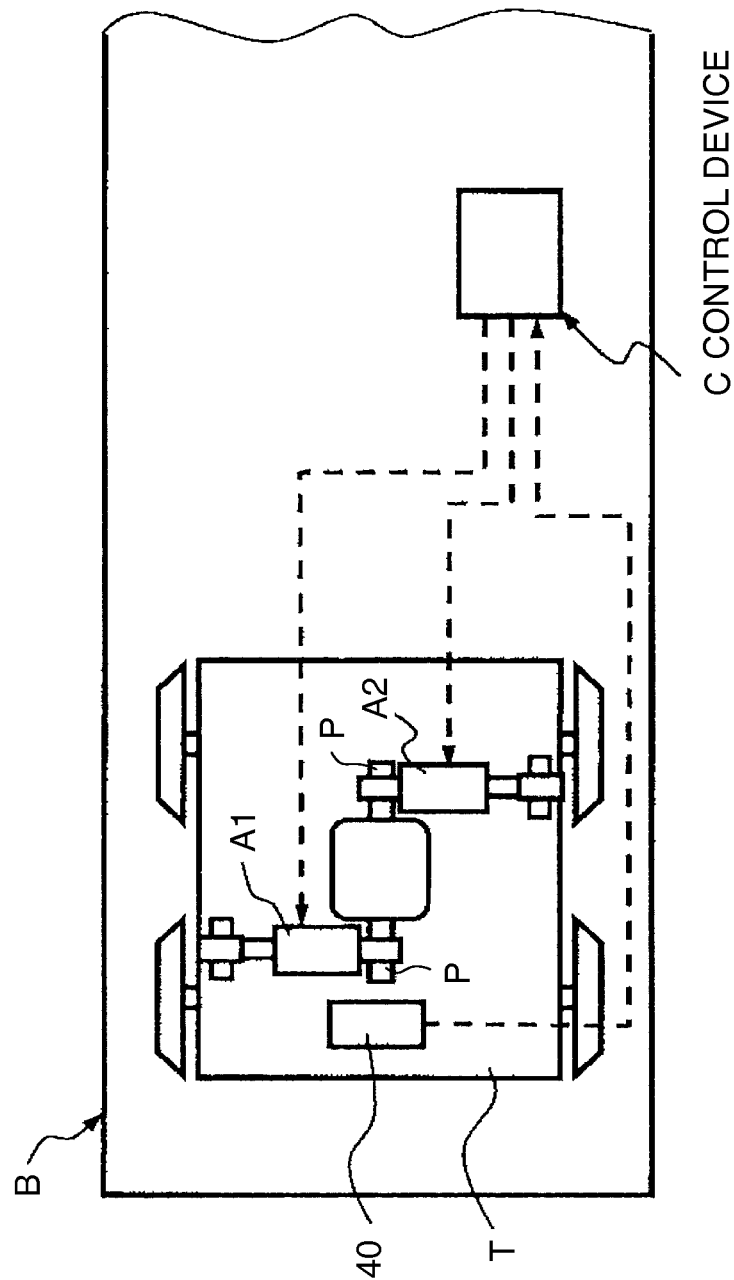
FIG. 1 is a schematic plan view showing essential parts of a railway vehicle installed with a railway vehicle vibration damping device according to an embodiment of this invention.

Referring to FIG. 1 of the drawings, a railway vehicle vibration damping device 1 according to an embodiment of this invention serves as a vibration damping device for a vehicle body B of a railway vehicle.

The railway vehicle vibration damping device 1 comprises hydraulic actuators A1 and A2 interposed between a bogie T and the vehicle body B of the railway vehicle, and a control device C that performs active control of the actuators A1 and A2. One end of each of the actuators A1 and A2 is coupled to a pin P projecting from the vehicle body B in a front-aft direction, and another end is coupled to the bogie T.

The control device C suppresses horizontal vibration of the vehicle body B in a vehicle transverse direction by performing active control of the actuators A1 and A2, or in other words by causing the actuators A1 and A2 to function as active dampers.

The control device C detects a horizontal acceleration α of the vehicle body B in the vehicle transverse direction, and on the basis of the horizontal acceleration α, calculates a low frequency vibration suppression force FL and a high frequency vibration suppression force FH required to suppress vibration of the vehicle body B.

The control device C also determines whether a current travel position of the railway vehicle is in a curve section or a non-curve section.

When the railway vehicle is traveling in a non-curve section, the control device C causes the actuator A1 to generate the high frequency vibration suppression force FH and causes the actuator A2 to generate the low frequency vibration suppression force FS.

When the railway vehicle is traveling in a curve section, on the other hand, the control device C causes the actuator A1 to generate the high frequency vibration suppression force FH and causes the actuator A2 to function as a passive damper.

A specific configuration of the actuators A1 and A2 will be described below. The actuators A1 and A2 are configured identically, and therefore, to avoid redundant description, only the configuration of the actuator A1 will be described and the description of the other actuator A2 will be omitted.

Figure 2:
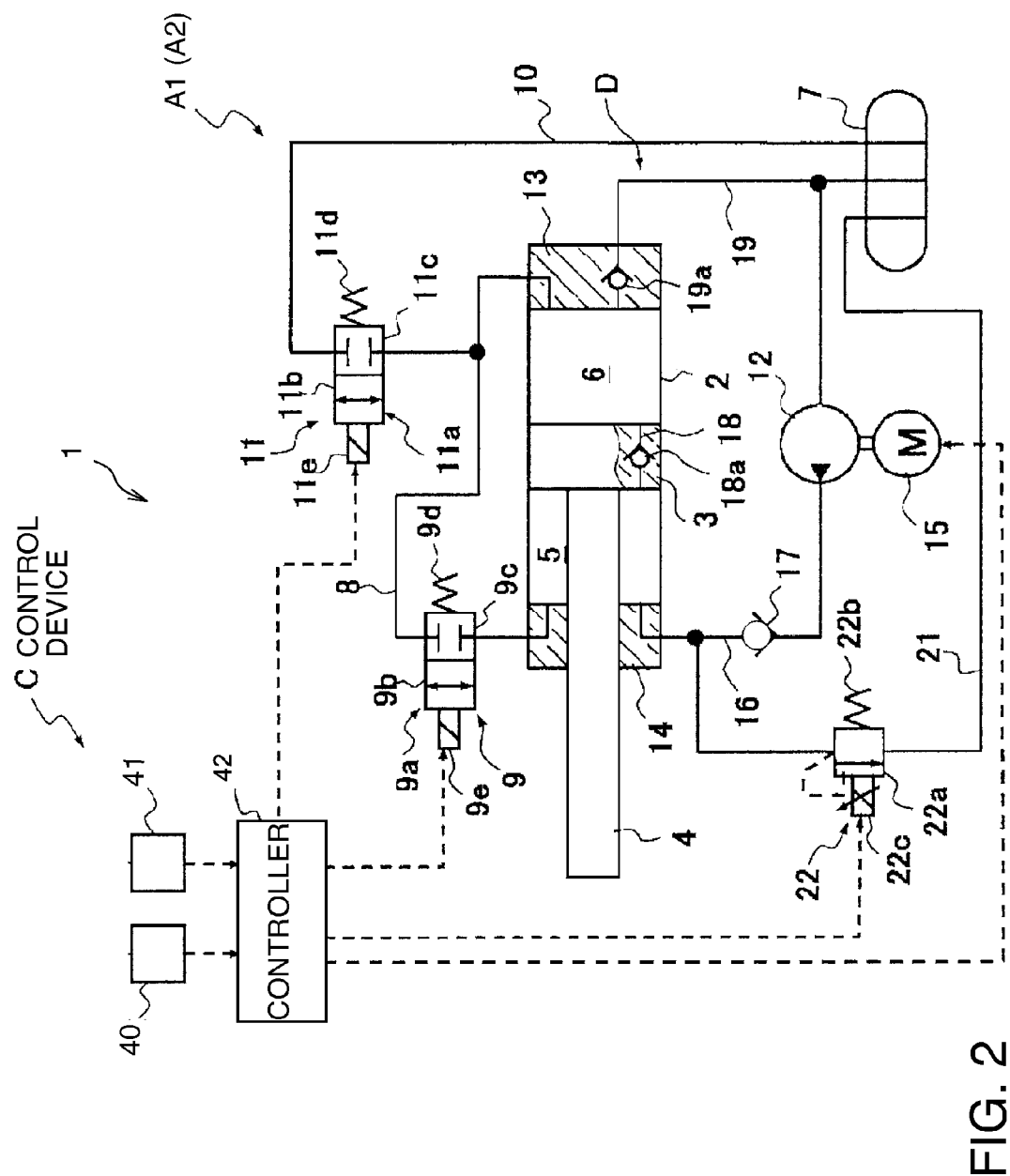
FIG. 2 is a hydraulic circuit diagram of an actuator provided in the railway vehicle vibration damping device.

Referring to FIG. 2, the actuator A1 is constituted by a single rod type actuator. The actuator A1 comprises a cylinder 2 coupled to one of the bogie T and the vehicle body B of the railway vehicle, a piston 3 housed in the cylinder 2 to be free to slide, and a rod 4 joined to the piston 3 at one end and coupled to the other of the bogie T and the vehicle body B at another end.

A rod side chamber 5 and a piston side chamber 6 are defined within the cylinder 2 by the piston 3. Working oil fills the rod side chamber 5 and the piston side chamber 6. An oil tank 7 is provided on the outside of the actuator A1. A gas is charged into the tank 7 in addition to the working oil. It should be noted, however, that there is no need to pressurize the tank 7 by charging the gas in a compressed condition.

The rod side chamber 5 and the piston side chamber 6 are connected by a first passage 8. A first shut-off valve 9 is provided in the first passage 8. The piston side chamber 6 and the tank 7 are connected by a second passage 10. A second shut-off valve 11 is provided in the second passage 10. The working oil is supplied to the rod side chamber 5 from a pump 12. It should be noted that although the first passage 8 connects the rod side chamber 5 to the piston side chamber 6 on the exterior of the cylinder 2, the first passage 8 may be provided in the piston 3.

The actuator A1 performs an expansion operation by operating the pump 12 in a condition where the first shut-off valve 9 is open such that the first passage 8 is communicative and the second shut-off valve 11 is closed such that the second passage 10 is blocked. Further, the actuator A1 performs a contraction operation by operating the pump 12 in a condition where the second shut-off valve 11 is open such that the second passage 10 is communicative and the first shut-off valve 9 is closed such that the first passage 8 is blocked.

The respective parts of the actuator A1 will now be described in detail. The cylinder 2 is formed in a tubular shape. An end portion of the cylinder 2 on a right side of the figure is closed by a lid 13, and an annular rod guide 14 is fixed to another end portion thereof on a left side of the figure. The rod guide 14 supports the rod 4 inserted into the cylinder 2 to be free to slide. One end of the rod 4 projects from the cylinder 2 to an axial direction outer side, and another end of the rod 4 is joined to the piston 3 within the cylinder 2.

A space between an outer periphery of the rod 4 and the cylinder 2 is sealed by a seal member such that the interior of the cylinder 2 is maintained in an airtight condition. As described above, the working oil fills the rod side chamber 5 and the piston side chamber 6 defined within the cylinder 2 by the piston 3. Any other liquid suitable for an actuator may be used instead of the working oil.

In the actuator A1, a sectional area of the rod 4 is set at half a sectional area of the piston 3. As a result, a pressure receiving surface area of the piston 3 on the rod side chamber 5 side is half a pressure receiving surface area of the piston 3 on the piston side chamber 6 side. When a pressure in the rod side chamber 5 is identical during the expansion operation and the contraction operation of the actuator A1, an identical thrust is generated in relation to both expansion and contraction. An amount of supplied working oil relative to a displacement amount of the actuator A1 is also identical in both expansion and contraction directions.

More specifically, when the actuator A1 is caused to perform the expansion operation, the rod side chamber 5 and the piston side chamber 6 communicate with each other. As a result, the pressure in the rod side chamber 5 becomes equal to a pressure in the piston side chamber 6, and therefore an expansion side thrust obtained by multiplying the pressure by a pressure receiving surface area difference between the rod side chamber 5 side and the piston side chamber 6 side of the piston 3 is generated. Conversely, when the actuator A1 is caused to perform the contraction operation, communication between the rod side chamber 5 and the piston side chamber 6 is blocked, and the piston side chamber 6 is opened to the tank 7. As a result, a contraction side thrust obtained by multiplying the pressure in the rod side chamber 5 by the pressure receiving surface area of the piston 3 on the rod side chamber 5 side is generated. Hence, during both expansion and contraction, the thrust generated by the actuator A1 takes a value obtained by multiplying the pressure in the rod side chamber 5 by half the sectional area of the piston 3.

Therefore, the control device C can control the thrust of the actuator A1 simply by controlling the pressure of the rod side chamber 5 during both the expansion operation and the contraction operation. By setting the pressure receiving surface area on the rod side chamber 5 side of the piston 3 at half the pressure receiving surface area on the piston side chamber 6 side in this manner, the pressure of the rod side chamber 5 for generating equal thrust in both the expansion and contraction directions is equal in both the expansion and contraction directions, and therefore the control is easy. Further, the amount of supplied working oil relative to the displacement amount of the piston 3 is also equal regardless of a displacement direction, and therefore an identical response can be obtained during operations in both the expansion and contraction directions. Even when the pressure receiving surface area of the piston 3 in the rod side chamber 5 is not set at half the pressure receiving surface area in the piston side chamber 6, the thrust of the actuator A1 on both the expansion and contraction sides can be controlled by adjusting the pressure in the rod side chamber 5.

A tip end of the rod 4 and the lid 13 that closes a base end of the cylinder 2 are provided with attachment portions, not shown in the figures. The actuator A1 is interposed between the vehicle body B and the bogie T of the railway vehicle via these attachment portions.

The first shut-off valve 9 is constituted by a solenoid shut-off valve. The first shut-off valve 9 comprises a valve body 9a, a spring 9d, and a solenoid 9e. The valve body 9a has a communication position 9b in which the first passage 8 is open such that the rod side chamber 5 communicates with the piston side chamber 6, and a blocking position 9c in which communication between the rod side chamber 5 and the piston side chamber 6 is blocked. The spring 9d biases the valve body 9a toward the blocking position 9c. The solenoid 9e, when energized, drives the valve body 9a to the communication position 9b against the spring 9d.

The second shut-off valve 11 is constituted by a solenoid shut-off valve. The second shut-off valve 11 comprises a valve body 11a, a spring 11d, and a solenoid 11e. The valve body 11a has a communication position 11b in which the piston side chamber 6 communicates with the tank 7 via the second passage 10, and a blocking position 11c in which communication between the piston side chamber 6 and the tank 7 is blocked. The spring 11d biases the valve body 11a toward the blocking position 11c. The solenoid 11e, when energized, drives the valve body 11a to the communication position 11b against the spring 11d.

The pump 12 is driven to rotate by an electric motor 15. The pump 12 discharges the working oil in only one direction. A discharge port of the pump 12 communicates with the rod side chamber 5 via a supply passage 16. A suction port of the pump 12 communicates with the tank 7. The pump 12 is driven to rotate by the electric motor 15 so as to suction working oil from the tank 7 and supply pressurized working oil to the rod side chamber 5.

Since the pump 12 discharges the working oil in only one direction, an operation to switch a rotation direction thereof is not required. Hence, a problem whereby a discharge amount varies when the rotation direction is switched does not arise, and therefore an inexpensive gear pump or the like can be used. Further, the rotation direction of the pump 12 is always the same direction, and therefore the electric motor 15 that drives the pump 12 does not require a high degree of response in relation to a rotation direction switch. Hence, an inexpensive motor may likewise be used as the electric motor 15. A check valve 17 that prevents reverse flow of the working oil from the rod side chamber 5 to the pump 12 is provided in the supply passage 16.

When the actuator A1 is caused to perform the expansion operation by supplying a predetermined discharge flow from the pump 12 to the rod side chamber 5, the pressure in the rod side chamber 5 is adjusted by performing control to open the first shut-off valve 9 and open and close the second shut-off valve 11. When the actuator A1 is caused to perform the contraction operation, the pressure in the rod side chamber 5 is adjusted by performing control to open the second shut-off valve 11 and open and close the first shut-off valve 9. In so doing, thrust corresponding to the vibration suppression force calculated by the control device C is obtained.

During the expansion operation of the actuator A1, the rod side chamber 5 and the piston side chamber 6 communicate with each other such that the pressure in the piston side chamber 6 is equal to the pressure in the rod side chamber 5. Hence, the thrust can be controlled by controlling the pressure in the rod side chamber 5 during both the expansion operation and the contraction operation. The first shut-off valve 9 and the second shut-off valve 11 may also be constituted by variable relief valves having a relief pressure adjustment function. In this case, the thrust of the actuator A1 is controlled by adjusting a valve opening pressure of the first shut-off valve 9 or the second shut-off valve 11 rather than causing the actuator A1 to expand and contract by performing an opening/closing operation on the first shut-off valve 9 or the second shut-off valve 11.

The railway vehicle vibration damping device 1 comprises a variable a relief valve 22 constituted by a proportional solenoid relief valve. The variable relief valve 22 is provided in a discharge passage 21 connecting the rod side chamber 5 and the tank 7, and comprises a valve body 22a, a spring 22b that biases the valve body 22a in a direction for blocking the discharge passage 21, and a proportional solenoid 22c which, when energized, exerts thrust on the valve body 22a against the spring 22b. The control device C controls the relief pressure by controlling a current amount supplied to the proportional solenoid 22c.

In the variable relief valve 22, when the pressure in the rod side chamber 5 exceeds the relief pressure, a resultant force of the pressure in the rod side chamber 5 and the thrust generated by the proportional solenoid 22c, which is exerted on the valve body 22a, overcomes a biasing force of the spring 22b, thereby driving the valve body 22a to an open position such that the discharge passage 21 is opened.

In the variable relief valve 22, the thrust generated by the proportional solenoid 22c can be increased by increasing the current amount supplied to the proportional solenoid 22c. In other words, when the current amount supplied to the proportional solenoid 22c is set at a maximum, the relief pressure of the variable relief valve 22 reaches a minimum, and when no current is supplied to the proportional solenoid 22c, the relief pressure reaches a maximum.

By providing the discharge passage 21 and the variable relief valve 22, the pressure in the rod side chamber 5 is adjusted to the relief pressure of the variable relief valve 22 during the expansion and contraction operations of the actuator A1. By setting the relief pressure of the variable relief valve 22 thus, the pressure in the rod side chamber 5 can be adjusted easily. By providing the discharge passage 21 and the variable relief valve 22, the need for a sensor to adjust the thrust of the actuator A1 can be eliminated. There is also no need to open and close the first shut-off valve 9 and the second shut-off valve 11 at high speed, and no need to form the first shut-off valve 9 and the second shut-off valve 11 from variable relief valves having an opening/closing function. As a result, a manufacturing cost of the railway vehicle vibration damping device 1 can be reduced, and a robust damping system in terms of both hardware and software can be constructed.

By forming the variable relief valve 22 from a proportional solenoid relief valve in which the relief pressure can be controlled proportionally in accordance with the applied current amount, the relief pressure can be controlled easily. However, as long as the relief pressure can be adjusted, a valve other than a proportional solenoid relief valve may be used as the variable relief valve 22.

When the pressure in the rod side chamber 5 exceeds the relief pressure, the variable relief valve 22 opens the discharge passage 21 regardless of the open/closed condition of the first shut-off valve 9 and the second shut-off valve 11 such that the rod side chamber 5 communicates with the tank 7. As a result, the excessive pressure in the rod side chamber 5 is released into the tank 7. By providing the discharge passage 21 and the variable relief valve 22, the entire system can be protected against excessive input into the actuator A1, for example.

The actuator A1 comprises a damper circuit D. The damper circuit D causes the actuator A1 to function as a damper when the first shut-off valve 9 and the second shut-off valve 11 are both closed. The damper circuit D comprises a one-way passage 18 that allows the working oil to flow only from the piston side chamber 6 to the rod side chamber 5, and a suction passage 19 that allows the working oil to flow only from the tank 7 to the piston side chamber 6. Further, the variable relief valve 22 provided in the discharge passage 21 functions as a damping valve.

More specifically, the one-way passage 18 allows the working oil to flow only from the piston side chamber 6 to the rod side chamber 5 using a check valve 18a provided therein. The suction passage 19 allows the working oil to flow only from the tank 7 to the piston side chamber 6 using a check valve 19a provided therein. By providing the blocking position 9c of the first shut-off valve 9 with a check valve that allows the working oil to flow only from the piston side chamber 6 to the rod side chamber 5, the one-way passage 18 may be omitted. Likewise, by providing the blocking position 11c of the second shut-off valve 11 with a check valve that allows the working oil to flow only from the tank 7 to the piston side chamber 6, the suction passage 19 may be omitted.

When the first shut-off valve 9 is in the blocking position 9c and the second shut-off valve 11 is in the blocking positions 11c, the one-way passage 18, the discharge passage 21, and the suction passage 19 of the damper circuit D provided in the actuator A1 form a circulation passage passing through the piston side chamber 6, the rod side chamber 5, and the tank 7. Herein, the one-way passage 18, the suction passage 19, and the discharge passage 21 are all one-way passages. Therefore, when the actuator A1 is caused to expand and contract by an external force, working oil from the cylinder 2 is invariably discharged to the tank 7 through the discharge passage 21.

On the other hand, a working oil deficiency in the cylinder 2 is alleviated by supplying working oil to the cylinder 2 from the tank 7 through the suction passage 19. The variable relief valve 22 serves as resistance to this flow of working oil such that the pressure in the cylinder 2 is regulated to the relief pressure. In other words, the variable relief valve 22 functions as a pressure control valve, and the actuator A1 functions as a uniflow passive damper.

As described above, the actuator A1 is configured to function as both an actuator and a passive damper. It should be noted that, instead of using the variable relief valve 22 and the discharge passage 21, the damper circuit D may be formed by providing a passage that connects the rod side chamber 5 and the tank 7 separately, and providing a damping valve in this passage.

During a failure in which the respective components of the actuator A1 cannot be energized, the valve body 9a of the first shut-off valve 9 is pressed by the spring 9d so as to be held in the blocking position 9c, and the valve body 11a of the second shut-off valve 11 is pressed by the spring 11d so as to be held in the blocking position 11c. The variable relief valve 22, meanwhile, functions as a pressure control valve in which the relief pressure is fixed at a maximum. Accordingly, the actuator A1 functions as a passive damper. When the actuator A1 functions as a passive damper, the variable relief valve 22 functions as a damping valve. A damping characteristic obtained in a case where the actuator A1 is caused to function as a passive damper can be set as desired by setting the relief pressure of the variable relief valve 22 when the current amount is zero.

To cause the actuators A1 and A2 configured as described above to generate thrust in the expansion direction, the control device C rotates the electric motor 15 with respect to the respective actuators A1 and A2 to supply working oil from the pump 12 into the cylinder 2 while setting the first shut-off valve 9 in the communication position 9b and setting the second shut-off valve 11 in the blocking position 11c. Through this operation, the working oil is supplied from the pump 12 to the rod side chambers 5 and the piston side chambers 6 of the respective actuators A1 and A2 while the rod side chambers 5 and the piston side chambers 6 communicate with each other. Accordingly, the piston 3 is pressed leftward in FIG. 2 by the pressure receiving surface area difference, with the result that the actuators A1 and A2 respectively generate thrust in the expansion direction.

When the pressure in the rod side chamber 5 and the piston side chamber 6 exceeds the relief pressure of the variable relief valve 22, the variable relief valve 22 opens such that the working oil flows out into the tank 7 through the discharge passage 21. Accordingly, the pressure in the rod side chamber 5 and the piston side chamber 6 is maintained at the relief pressure of the variable relief valve 22, which is determined by the current amount applied to the variable relief valve 22. The thrust generated by the respective actuators A1 and A2 is equal to a value obtained by multiplying the pressure in the rod side chamber 5 by the pressure receiving surface area difference between the piston side chamber 6 side and the rod side chamber 5 side of the piston 3.

To cause the actuators A1 and A2 to generate thrust in the contraction direction, on the other hand, the control device C rotates the electric motor 15 in relation to the respective actuators A1 and A2 to supply working oil from the pump 12 into the rod side chamber 5 while setting the first shut-off valve 9 in the blocking position 9c and setting the second shut-off valve 11 in the communication position 11b. In so doing, the working oil is supplied to the rod side chamber 5 from the pump 12 while the piston side chamber 6 communicates with the tank 7, and therefore the piston 3 is pressed in a rightward direction of FIG. 2, with the result that the actuators A1 and A2 respectively generate thrust in the contraction direction. The thrust generated by the respective actuators A1 and A2 is equal to a value obtained by multiplying the pressure in the rod side chamber 5 by the pressure receiving surface area of the piston on the rod side chamber 5 side.

The actuators A1 and A2 not only function as actuators, or in other words active dampers, but also function as passive dampers by simply performing an opening/closing operation on the first shut-off valve 9 and the second shut-off valve 11 regardless of a driving condition of the electric motor 15. The actuators A1 and A2 can be switched between actuators and passive dampers easily, leading to improvements in a response and a reliability of the railway vehicle vibration damping device 1.

Since single rod type actuators are used as the actuators A1 and A2, a stroke length is easier to secure than with double rod type actuators, and therefore an overall length of the actuators is shortened. As a result, the railway vehicle vibration damping device 1 can be installed in the railway vehicle more easily.

The working oil that flows into the rod side chamber 5 from the pump 12 in the actuators A1 and A2 passes through the piston side chamber 6 and is ultimately recirculated to the tank 7. Therefore, even when gas is intermixed into the rod side chamber 5 or the piston side chamber 6, the gas is discharged into the tank 7 by the expansion and contraction operations of the actuators A1 and A2. As a result, a reduction in response during thrust generation can be prevented. Further, frequent maintenance operations for maintaining the performance of the actuators A1 and A2 are not required, and therefore labor and costs expended on maintenance can be reduced.

Moreover, during manufacture of the actuators A1 and A2, troublesome operations such as assembling the actuators A1 and A2 in oil or in a vacuum environment are not required, and an advanced degassing operation need not be performed on the working oil. As a result, the actuators A1 and A2 can be manufactured with high productivity, leading to a reduction in manufacturing cost.

The control device C comprises a front side acceleration sensor 40 that detects the horizontal acceleration α in the vehicle transverse direction of the vehicle body B above the bogie T, and a locus information acquisition unit 41 that detects a travel position of the railway vehicle.

The locus information acquisition unit 41 is constituted by a central vehicle monitor disposed in a certain specific carriage of coupled cars, or a vehicle monitor terminal connected thereto, and is used to obtain information indicating the travel position of the railway vehicle in real time. The locus information acquisition unit 41 is not limited to a vehicle monitor, and may be constructed using a Global Positioning System (GPS) or the like.

The control device C comprises a controller 42 that determines whether or not the railway vehicle is traveling in a curve section on the basis of the travel position detected by the locus information acquisition unit 41, and in accordance with a determination result, outputs control commands respectively to the electric motor 15, the solenoid 9e of the first shut-off valve 9, the solenoid 11e of the second shut-off valve 11, and the proportional solenoid 22c of the variable relief valve 22 of each of the actuators A1 and A2.

The controller 42 is constituted by a microcomputer comprising a central processing unit (CPU), a read only memory (ROM), a random access memory (RAM), and an input/output interface (I/O interface). The controller 42 may be constituted by a plurality of microcomputers.

The controller 42 processes the horizontal acceleration α in the vehicle transverse direction, and determines whether or not the railway vehicle is traveling in a curve section on the basis of the travel position of the railway vehicle detected by the locus information acquisition unit 41. In accordance with the determination result, the controller 42 outputs control commands respectively to the electric motor 15, the solenoid 9e of the first shut-off valve 9, the solenoid 11e of the second shut-off valve 11, and the proportional solenoid 22c of the variable relief valve 22 in relation to the respective actuators A1 and A2.

Figure 3:
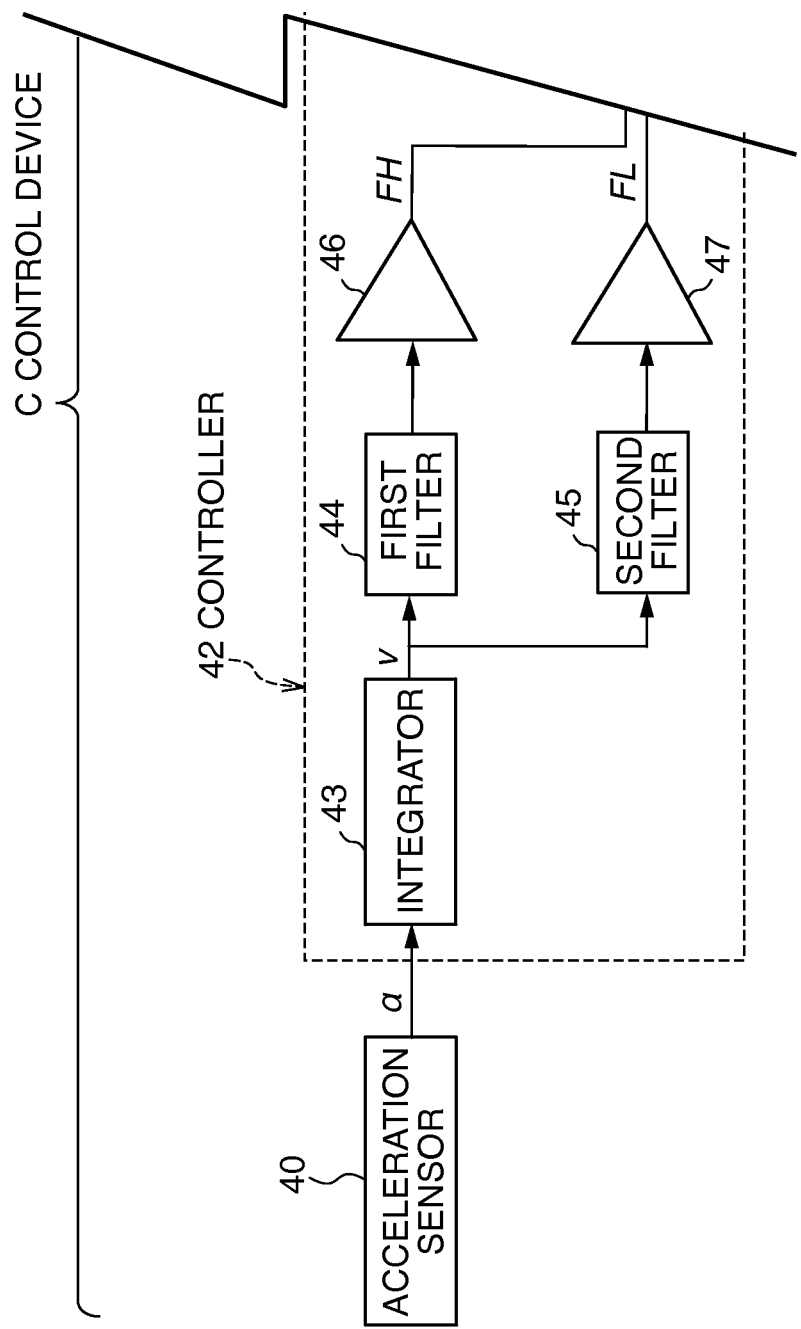
FIG. 3 is a block diagram showing a part of control functions of a control device provided in the railway vehicle vibration damping device.
Figure 4:
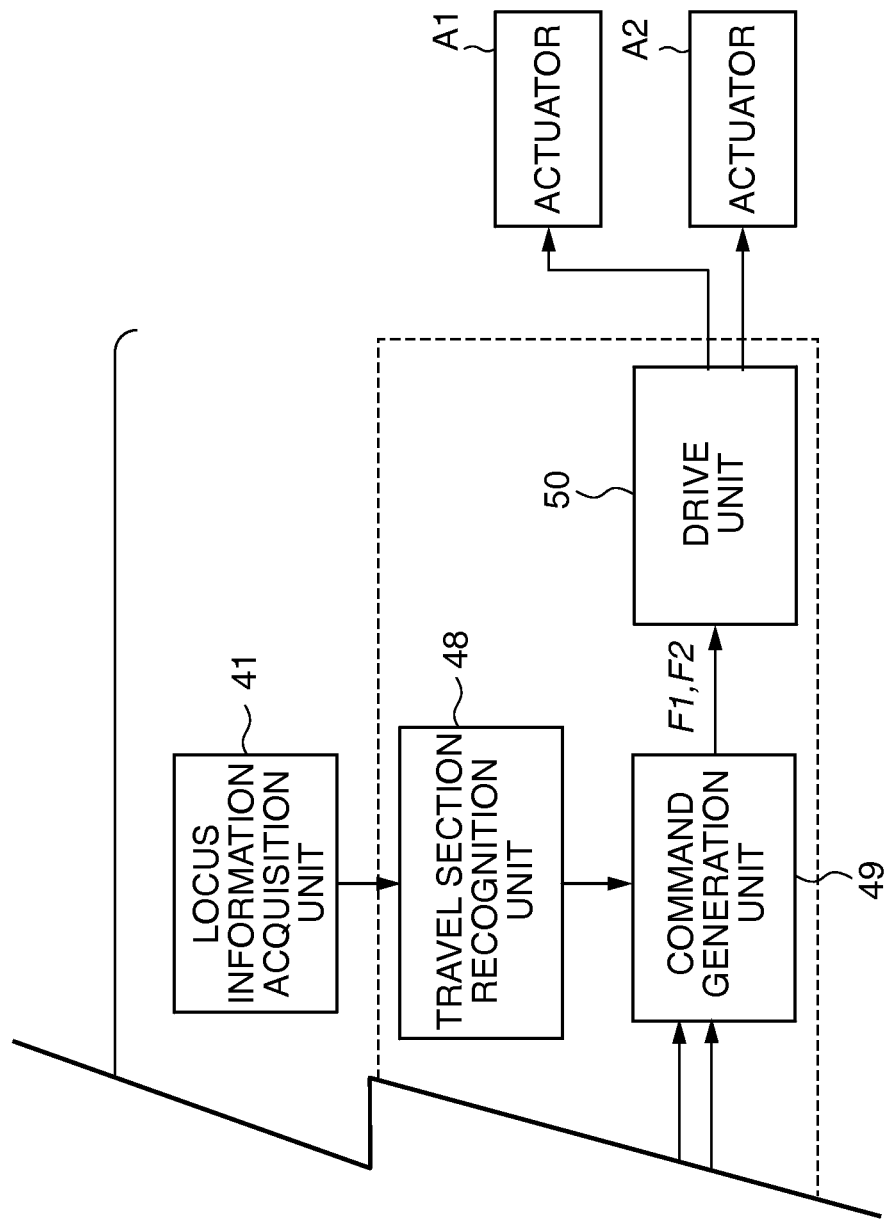
FIG. 4 is a block diagram showing a remaining part of the control functions of the control device.

Referring to FIGS. 3 and 4, the controller 42 comprises an integrator 43, a first filter 44, a second filter 45, a multiplier 46, a multiplier 47, a travel section recognition unit 48, a command generation unit 49, and a driving unit 50.

The integrator 43 calculates a transverse direction velocity v by integrating the horizontal acceleration α in the vehicle transverse direction detected by the acceleration sensor 40.

The first filter 44 and the second filter 45 respectively filter the transverse direction velocity v.

The multiplier 46 calculates the high frequency vibration suppression force FH by multiplying the transverse direction velocity v filtered by the first filter 44 by a skyhook gain.

The multiplier 47 calculates the low frequency vibration suppression force FL by multiplying the transverse direction velocity v filtered by the second filter 45 by a skyhook gain.

The travel section recognition unit 48 determines whether or not the travel section of the railway vehicle is a curve section on the basis of the travel position detected by the locus information acquisition unit 41.

The command generation unit 49 generates a control command F1 to be applied to the actuator A1 and a control command F2 to be applied to the actuator A2 from the high frequency vibration suppression force FH and the low frequency vibration suppression force FL.

The driving unit 50 supplies corresponding currents to the electric motor 15, the solenoid 9e of the first shut-off valve 9, the solenoid 11e of the second shut-off valve 11, and the proportional solenoid 22c of the variable relief valve 22 of each of the actuators A1 and A2 on the basis of the control commands F1 and F2.

As a hardware resource, the control device C comprises an A/D converter, not shown in the figures, for importing signals output by the acceleration sensor 40. The first filter 44 and the second filter 45 may be realized on a program of the controller 42, or the first filter 44 and the second filter 45 may be provided separately, independently of the controller 42.

The horizontal acceleration α is set to be positive when oriented upward in FIG. 1 and negative when oriented downward, for example. The acceleration sensor 40 is preferably disposed on the vehicle body B directly above the bogie T. However, as long as output data therefrom can be used to calculate the horizontal acceleration α of the vehicle body B directly above the bogie T, the acceleration sensor 40 may be disposed in another location.

The first filter 44 is constituted by a high pass filter that extracts from the transverse direction velocity v a frequency component at or above a frequency of centrifugal acceleration that acts on the vehicle body B when the railway vehicle travels through a curve section. The frequency of the centrifugal acceleration that acts on the vehicle body B when the railway vehicle travels through a curve section depends on an actual travel velocity of the railway vehicle and so on, but is approximately equal to or smaller than 0.5 Hz. Accordingly, a cutoff frequency of the first filter 44 is set at 1 Hz or more, for example. Herein, the cutoff frequency is set at 2 Hz to ensure that the high frequency vibration suppression force FH is insensitive to centrifugal acceleration and therefore not affected by the centrifugal acceleration.

The second filter 45 is constituted by a high pass filter that extracts from the transverse direction velocity v a frequency component at or above a resonance frequency of the vehicle body B. Generally, the resonance frequency of the vehicle body B supported on the bogie T by a spring is approximately 1 Hz. Herein, a cutoff frequency of the second filter 45 is set at approximately 0.3 Hz.

In a lower frequency band than the cutoff frequencies of the first filter 44 and the second filter 45, a phase advances, and therefore a phase compensator may be provided separately. Further, a band pass filter that extracts only a component in the resonance frequency band of the vehicle body B may be used as the second filter 45. Alternatively, the second filter 45 may be constituted by a low pass filter that extracts a component at or below the resonance frequency band of the vehicle body B.

The transverse velocity v filtered by the first filter 44 is input into the multiplier 46. The transverse velocity v filtered by the second filter 45 is input into the multiplier 47. The multiplier 46 calculates the high frequency vibration suppression force FH by multiplying a skyhook gain by the frequency component of the transverse direction velocity v following removal by the first filter 44 of the frequency component at or below the frequency of the centrifugal acceleration. The multiplier 47 calculates the low frequency vibration suppression force FL by multiplying a skyhook gain by the frequency component of the transverse direction velocity v including the component at the resonance frequency of the vehicle body B, extracted by the second filter 45.

The travel section recognition unit 48 determines whether or not the railway vehicle is traveling in a curve section from the travel position information obtained from the locus information acquisition unit 41, and outputs the determination result to the command generation unit 49.

More specifically, for example, the travel section recognition unit 48 comprises a map on which travel loci are associated with travel section information, and determines whether or not the current travel section is a curve section from the travel locus of the railway vehicle by referring to the map.

Alternatively, transmitters that issue signals may be provided on boundaries between curve sections and other sections or at the front and rear of curve sections, and a receiver that receives the signals from the transmitters may be provided on the railway vehicle side as a locus information acquisition unit. In this case, the travel section recognition unit 48 determines that the railway vehicle has entered a curve section upon reception of a signal from a transmitter disposed at an entrance to the curve section, and determines that the railway vehicle has left the curve section and entered a non-curve section upon reception of a signal from a transmitter disposed at an exit from the curve section. Basically, the travel section recognition unit 48 may take any form as long as it is capable of determining that the railway vehicle is traveling in a curve section. To maintain favorable passenger comfort during travel in a curve section, the railway vehicle vibration damping device 1 preferably switches from control executed in a section other than a curve section to control executed in a curve section before the railway vehicle actually enters the curve section.

For this purpose, a locus for determining that the railway vehicle has entered the curve section is preferably set in a linear section before an actual curve start locus. Similarly, a locus for determining that the railway vehicle has left a curve section and entered a non-curve section is preferably set in a linear section after an actual curve end locus.

Furthermore, the travel section information associated with the travel loci preferably includes information for setting a damping coefficient when the actuator A2 is caused to function as a passive damper in addition to the information for determining whether the travel section is a curve section or not. More specifically, this information includes information relating to characteristics of the curve section such as a cant and a curvature of the curve section, whether the curve section is a transition curve or a steady curve, a pattern and a slack of the curve when the curve section is a transition curve, and so on.

The command generation unit 49 calculates the control command F1 to be applied to the actuator A1 and the control command F2 to be applied to the actuator A2 from the determination result of the travel section recognition unit 48, the low frequency vibration suppression force FL, and the high frequency vibration suppression force FH.

More specifically, when the travel section recognition unit 48 determines that the railway vehicle is traveling in a section other than a curve section, the command generation unit 49 generates the control command F1 to cause the actuator A1 to output the high frequency vibration suppression force FH, and generates the control command F2 to cause the actuator A2 to output the low frequency vibration suppression force FL.

When the travel section recognition unit 48 determines that the railway vehicle is traveling in a curve section, on the other hand, the command generation unit 49 generates the control command F1 to cause the actuator A1 to output the high frequency vibration suppression force FH, and generates the control command F2 to cause the actuator A2 to function as a passive damper.

The driving unit 50 causes the actuators A1 and A2 to generate thrust or to function as passive dampers in accordance with the control commands F1 and F2. For this purpose, the driving unit 50 outputs currents to the electric motor 15, the solenoid 9e of the first shut-off valve 9, the solenoid 11e of the second shut-off valve 11, and the proportional solenoid 22c of the variable relief valve 22 in relation to the respective actuators A1 and A2.

In more detail, in a case where the control commands F1 and F2 do not cause the actuators A1 and A2 to function as passive dampers, the driving unit 50 outputs currents to the electric motor 15, the solenoid 9e of the first shut-off valve 9, the solenoid 11e of the second shut-off valve 11, and the proportional solenoid 22c of the variable relief valve 22 of each of the actuators A1 and A2 based on the control commands F1 and F2 such that desired direction and magnitude of the thrust are realized by each actuator A1, A2. Control precision is preferably secured by feedback controlling the current command applied to the proportional solenoid 22c on the basis of the thrust output by the actuators A1 and A2.

Further, in a case where the control command F2 causes the actuator A2 to function as a passive damper, the driving unit 50 sets the currents output to the electric motor 15, the solenoid 9e of the first shut-off valve 9, the solenoid 11e of the second shut-off valve 11, and the proportional solenoid 22c of the variable relief valve 22 of the actuator A2 at zero. In the actuator A2, the working oil is always discharged from the cylinder 2 during both the expansion and contraction direction operations. The discharged working oil is returned to the tank 7 via the discharge passage 21. By applying resistance to this flow using the variable relief valve 22, the actuator A2 is caused to function as a passive damper.

The current applied to the electric motor 15 need not be set at exactly zero, and instead, a rotation speed of the electric motor 15 may be reduced to an extent that does not adversely affect functioning of the actuator A2 as a passive damper. When the railway vehicle enters a section other than a curve section after traveling through a curve section, the control command F2 for causing the actuator A2 to output the low frequency vibration suppression force FL is generated. As a result, the actuator A2 is returned from a passive damper state to an actuator sate where thrust corresponding to the low frequency vibration suppression force FL is generated.

When information such as the cant and the curvature of the curve section has been obtained and the actuator A2 is to be caused to function as a passive damper, the current amount to be applied to the proportional solenoid 22c of the variable relief valve 22 of the actuator A2 is preferably determined from this information, and the damping coefficient of the actuator A2 is preferably set at an optimum value for the curve section through which the railway vehicle is traveling. In this case, damping coefficients are determined in advance for respective curve sections.

Alternatively, current amounts to be applied to the proportional solenoid 22c of the variable relief valve 22 are determined in advance for the respective curve sections. The damping coefficient of the actuator A2 is thereby optimized for each curve section of the railway vehicle.

According to the railway vehicle vibration damping device 1, as described above, when the railway vehicle is traveling through a non-curve section, a part A1 of the actuators outputs the high frequency vibration suppression force FH, and the remaining actuator A2 outputs the low frequency vibration suppression force FL. Accordingly, an appropriate force for suppressing vibration of the vehicle body B in a wide frequency range can be generated, and as a result, the vibration of the vehicle body B can be reduced, enabling an improvement in the passenger comfort of the railway vehicle.

Further, according to the railway vehicle vibration damping device 1, when the railway vehicle is traveling through a curve section, a part A1 of the actuators A1, A2 outputs the high frequency vibration suppression force FH and the remaining actuator A2 functions as a passive damper. Thus, the railway vehicle vibration damping device 1 can effectively suppress vibration at a higher frequency than the frequency of the centrifugal acceleration acting on the vehicle body B during travel in a curve section. Low-frequency vibration, meanwhile, can be suppressed effectively without influence from the centrifugal acceleration by the damping force generated by the passive damper. As a result, the passenger comfort of the railway vehicle during travel in a curve section can be improved. A reason for this will be described below.

The acceleration detected by the acceleration sensor 40 during travel in a curve section includes a centrifugal acceleration component in a frequency band that is close to the resonance frequency band of the vehicle body B. This centrifugal acceleration component cannot be removed completely even by filter processing. Therefore, when the actuators A1 and A2 are controlled as actuators similarly during travel in both a curve section and a non-curve section, the thrust generated by the actuators A1 and A2 becomes excessive in a curve section.

Conversely, when an attempt is made to remove the vibration component of the centrifugal acceleration from the acceleration detected by the acceleration sensor 40, a component in the resonance frequency band of the vehicle body B, which is close to the frequency band of the centrifugal acceleration included in the horizontal direction acceleration of the vehicle body B in the vehicle transverse direction, is also removed. As a result, the thrust generated by the actuators A1 and A2 becomes insufficient, leading to deterioration of the passenger comfort.

In a curve section, the railway vehicle vibration damping device 1 suppresses vibration by causing the actuator A2 to function as a passive damper with respect to low frequency vibration in the frequency band of the centrifugal acceleration and the resonance frequency band of the vehicle body B, and causing the actuator A1 to generate a suppression force with respect to vibration in a frequency band equal to or higher than the frequency of the centrifugal acceleration. Therefore, vibration in the resonance frequency band of the vehicle body B can be suppressed sufficiently, and high frequency vibration can also be suppressed effectively. As a result, favorable passenger comfort can be maintained even during travel in a curve section. This effect is exhibited favorably in curve sections constituted by both transition curves and steady curves.

In the railway vehicle vibration damping device 1 described above, the actuators A1 and A2 constitute vibration suppression force generating sources. More specifically, the actuator A1 corresponds to a part of the vibration suppression force generating sources, and the actuator A2 corresponds to all of the remaining vibration suppression force generating sources.

The contents of Tokugan 2012-56849, with a filing date of Mar. 14, 2012 in Japan, are hereby incorporated by reference.

Although the invention has been described above with reference to a certain embodiment, the invention is not limited to the embodiment described above. Modifications and variations of the embodiment described above will occur to those skilled in the art, within the scope of the claims. Examples of these modifications and variations will be illustrated below.

In a section other than a curve section, the respective actuators A1 and A2 may be caused to generate a combined force of the low frequency vibration suppression force FL and the high frequency vibration suppression force FH. Accordingly, in a curve section, the actuator A1 is caused to output the high frequency vibration suppression force FH and the actuator A2 is caused to function as a passive damper. Alternatively, in a curve section, the actuator A1 is caused to function as a passive damper and the actuator A2 is caused to output the high frequency vibration suppression force FH. Accordingly, in a non-curve section, the actuator A1 is caused to output the high frequency vibration suppression force FH and the actuator A2 is caused to output the low frequency vibration suppression force FL.

It should be noted, however, that always allocating a part A1 of the actuators A1 and A2 to high frequency suppression and allocating the remaining actuator A2 to low frequency suppression has the following advantage. When the actuator A1 always suppresses high frequency vibration, control of the actuator A1 need not be switched. Hence, the controller 42 can avoid rapid control command variation, and therefore switches between a mode implemented in a curve section and a mode implemented in a non-curve section can be performed smoothly. As a result, a behavior of the vehicle body B during a mode switch can be stabilized, enabling a further improvement in the passenger comfort of the railway vehicle.

Variable damping force dampers may also be used as the vibration suppression force generating sources. In this case, Karnopp control may be used to realize a skyhook damper. Herein, the low frequency vibration suppression force FL and the high frequency vibration suppression force FH may be calculated from the transverse direction velocity v of the vehicle body B, stroke directions of the variable damping force dampers, and skyhook gains.

A minimum requirement of this invention is that the actuator A2 functions as a passive damper in a curve section. The actuator A1, therefore, may be constituted by a specialized actuator not having a passive damper function. Further, the number of actuators is not limited to two, and more than two actuators may be disposed as long as a part of the actuators generates the high frequency vibration suppression force FH and all of the remaining actuators function as passive dampers in a curve section.

INDUSTRIAL APPLICABILITY

This invention brings about a favorable effect in improving passenger comfort in a railway vehicle.

The embodiment of this invention in which an exclusive property or privilege is claimed are defined as follows:
1. A railway vehicle vibration damping device comprising:
   at least two vibration suppression force generating sources interposed between a bogie and a vehicle body of a railway vehicle;
   a sensor that detects a transverse direction velocity of the vehicle body; and
   a programmable controller programmed to:
   extract from the transverse direction velocity of the vehicle body a frequency component at or above a frequency of a centrifugal acceleration that acts on the vehicle body when the railway vehicle travels in a curve section;
   calculate a high frequency vibration suppression force on the basis of the extracted frequency component of the transverse direction velocity;

extract a vehicle body resonance frequency component from the transverse direction velocity of the vehicle body;

calculate a low frequency vibration suppression force on the basis of the vehicle body resonance frequency component of the transverse direction velocity of the vehicle body; and when the railway vehicle travels in a curve section, cause at least a part of the vibration suppression force generating sources to output the high frequency vibration suppression force while causing all of the remaining vibration suppression force generating sources to function as passive dampers, and when the railway vehicle travels in a non-curve section, cause at least a part of the vibration suppression force generating sources to output the high frequency vibration suppression force while causing all of the remaining vibration suppression force generating sources to output the low frequency vibration suppression force.

2. The railway vehicle vibration damping device as defined in claim 1, wherein the vibration suppression force generating sources are actuators that exhibit a passive damper function when power current is not supplied thereto.

3. The railway vehicle vibration damping device as defined in claim 1, further comprising a locus information acquisition unit that obtains locus information indicating a travel position of the railway vehicle, wherein the controller is further programmed to determine whether or not the railway vehicle is traveling in a curve section on the basis of the travel position of the railway vehicle.

4. The railway vehicle vibration damping device as defined in claim 3, wherein the locus information acquisition unit is constituted by a monitor that obtains information indicating the travel position, and the controller is further programmed to determine whether or not a section in which the railway vehicle is currently traveling is a curve section on the basis of the travel position information.

5. The railway vehicle vibration damping device as defined in claim 1, wherein each of the vibration suppression force generating sources comprises:

a cylinder filled with a fluid;
a piston housed in the cylinder to be free to slide;
a rod inserted into the cylinder and coupled to the piston;
a rod side chamber and a piston side chamber defined within the cylinder by the piston;
a fluid tank;
a first shut-off valve provided in a first passage that connects the rod side chamber to the piston side chamber;
a second shut-off valve provided in a second passage that connects the piston side chamber to the tank;
a pump that supplies working oil from the tank to the rod side chamber;
a discharge passage that connects the rod side chamber to the tank;
a variable relief valve that is provided in the discharge passage and has a modifiable relief pressure;
a suction passage that allows the fluid to flow only from the tank to the piston side chamber; and
a one-way passage that allows the fluid to flow only from the piston side chamber to the rod side chamber.

6. A railway vehicle vibration damping device comprising:
at least two vibration suppression force generating sources interposed between a bogie and a vehicle body of a railway vehicle;
a sensor that detects a transverse direction velocity of the vehicle body; and
a programmable controller programmed to:
extract from the transverse direction velocity of the vehicle body a frequency component at or above a frequency of a centrifugal acceleration that acts on the vehicle body when the railway vehicle travels in a curve section;
calculate a high frequency vibration suppression force on the basis of the extracted frequency component of the transverse direction velocity;
extract a vehicle body resonance frequency component from the transverse direction velocity of the vehicle body;
calculate a low frequency vibration suppression force on the basis of the vehicle body resonance frequency component of the transverse direction velocity of the vehicle body;
when the railway vehicle travels in a non-curve section, cause at least a part of the vibration suppression force generating sources to output the high frequency vibration suppression force while causing all of the remaining vibration suppression force generating sources to output the low frequency vibration suppression force; and
when the railway vehicle travels in a non-curve section, cause all of the vibration suppression force generating sources to output a combined force of the high frequency vibration suppression force and the low frequency vibration suppression force.

7. A railway vehicle vibration damping device comprising:
at least two vibration suppression force generating sources interposed between a bogie and a vehicle body of a railway vehicle;
a sensor that detects a transverse direction velocity of the vehicle body; and
a programmable controller programmed to:
extract from the transverse direction velocity an extracted frequency component at or above a frequency of a centrifugal acceleration that acts on the vehicle body when the railway vehicle travels in a curve section;
calculate a high frequency vibration suppression force on a basis of the extracted frequency component;
extract a vehicle body resonance frequency component from the transverse direction velocity;
calculate a low frequency vibration suppression force on a basis of the vehicle body resonance frequency component; and
being responsive to the railway vehicle travelling in the curve section, by causing at least one, but not all, of the vibration suppression force generating sources to output the high frequency vibration suppression force, while causing all of the remaining vibration suppression force generating sources to function as passive dampers, and
being responsive to the railway vehicle travelling in a non-curve section, by causing at least one, but not all, of the vibration suppression force generating sources to output the high frequency vibration suppression force, while causing all of the remaining vibration suppression force generating sources to output the low frequency vibration suppression force.

* * * * *